United States Patent

Matsuzaki et al.

[11] Patent Number: 5,263,372
[45] Date of Patent: Nov. 23, 1993

[54] METHOD AND INSTRUMENT FOR MEASURING PRELOAD OF ROLLING BEARING

[75] Inventors: Hiroyuki Matsuzaki, Chigasaki; Takeo Kawamata; Takashi Maeda, both of Fujisawa, all of Japan

[73] Assignee: NSK Ltd., Tokyo, Japan

[21] Appl. No.: 904,146

[22] Filed: Jun. 25, 1992

[30] Foreign Application Priority Data

Jun. 28, 1991 [JP] Japan ............... 3-184092

[51] Int. Cl.$^5$ .................................. G01M 13/04
[52] U.S. Cl. ................... 73/593; 73/862.49; 73/862.59
[58] Field of Search ............ 73/593, 660, 865.3, 73/862.49, 862.59

[56] References Cited

U.S. PATENT DOCUMENTS

| | | | |
|---|---|---|---|
| 3,023,604 | 3/1962 | Gordon et al. | 73/593 |
| 3,287,966 | 11/1966 | Haan et al. | 73/862.49 |
| 4,352,293 | 10/1982 | Kurihara et al. | 73/593 |

FOREIGN PATENT DOCUMENTS

| | | | |
|---|---|---|---|
| 0039010 | 3/1980 | Japan | 73/593 |
| 0060244 | 4/1982 | Japan | 73/593 |
| 1049758 | 10/1983 | U.S.S.R. | 73/862.59 |

Primary Examiner—Hezron E. Williams
Assistant Examiner—Nashmiya Ashraf
Attorney, Agent, or Firm—Wegner, Cantor, Mueller & Player

[57] ABSTRACT

While maintaining a shaft in a fixed state, an outer ring is rotated. Vibrations of the shaft are detected by a first vibration pickup and a second vibration pickup. Detection signals of both the vibration pickups are delivered to a frequency converter via amplifier, respectively. The frequency converter determines, by Fourier transformation, the rotation frequency of the outer ring, the revolution frequency of balls and the resonance frequency of the double-row ball bearing. The first computing device then calculates the contact angle and bearing rigidity, and the second computing device calculates the preload.

6 Claims, 4 Drawing Sheets

METHOD AND INSTRUMENT FOR MEASURING PRELOAD OF ROLLING BEARING

BACKGROUND OF THE INVENTION

1) Field of the Invention

The present invention relates to a method and instrument for measuring a preload of a rolling bearing. The method and instrument are useful for the easy, prompt and accurate determination of a preload applied to a double-row ball bearing or duplex ball bearing or a double-row roller bearing or duplex roller bearing.

2) Description of the Related Art

For example, a double-row ball bearing such as that shown in FIG. 5 or a duplex ball bearing 6 such as that depicted in FIG. 6 has conventionally been assembled in bearing portions of various machines and apparatuses. Of these, the double-row ball bearing 1 shown in FIG. 5 is constructed of an outer ring 3 having double-row outer raceways 2,2 on an inner peripheral wall thereof, an inner ring 5 having double-row inner raceways 4,4 on an outer peripheral wall thereof, and plural balls 12 disposed for rotation between the outer raceways 2,2 and the inner raceways 4,4. Based on rolling of these balls 12, a member, such as a housing, with the outer ring 3 internally fitted thereon and supported thereon and another member, such as a shaft, with the outer ring 5 externally fitted and supported thereon are allowed to rotate relative to each other.

The duplex ball bearing 6 illustrated in FIG. 6 is constructed by combining, in opposite directions, a pair of ball bearings 11,11 each of which is composed of an outer ring 8 having an outer raceway 7 on an inner peripheral wall thereof, an inner ring 10 having an inner raceway 9 formed on an outer peripheral wall thereof and plural balls 12 provided for rotation between the outer raceway 7 and the inner raceway 9.

In such a double-row ball bearing 1 or duplex ball bearing 6, a line a extending through the points of contact of each ball 12 with the outer raceway 2 or 7 and inner raceway 4 or 9 is tilted at a (contact) angle α with respect to a line b extending at a right angle relative to a central axis of rotation and, at the same time, each ball 12 is pressed between the outer raceway 2 or 7 and the inner raceway 4 or 9, namely, the double-row ball bearing 1 or duplex ball bearing 6 is applied with a preload. Since the degree of such a preload (hereinafter simply called "preload") significantly affects the performance of the double-row ball bearing 1 and the duplex ball bearing 6, it is necessary to control the preload at a desired value. In particular, high-performance ball bearings require strict control of the preload.

As disclosed in Japanese Patent Application Laid-Open (Kokai) No. SHO 58-196318 and Japanese Patent Publication (Kokai) No. HEI 2-61700, there have hence been proposed methods for measuring a preload, which has been applied to a ball bearing, by applying a load or vibrations in a thrust direction to a part of the ball bearing.

Of these, the method disclosed in Japanese Patent Application Laid-Open (Kokai) No. SHO 58-196318 comprises applying an axial load to a part of a ball bearing and, at the same time, measuring displacements corresponding to variations in load, whereby a preload is estimated from the value of the load at which an abrupt displacement begins to take place. In the case of the method disclosed in Japanese Patent Publication (Kokai) No. HEI 2-61700, vibrations are applied to a ball bearing by a vibrator to detect the resonance frequency of the ball bearing and a preload is then determined from the resonance frequency. In addition, it is also practiced to estimate a preload, which has been applied to a ball bearing, by applying rotary force to an outer ring or inner ring constructing the ball bearing and then measuring a starting torque upon commencement of rotation of the member applied with the rotary force.

When a preload of a rolling bearing such as a ball bearing is measured by such conventional methods as referred to above, inconvenience are encountered as will be described next.

First, in the case of the method disclosed in Japanese Patent Application Laid-Open (Kokai) No. SHO 58-196318, an axial load is applied to a part of a ball bearing. As a result, impression or damage may occur on the surfaces of raceways so that rotation accuracy and service life of the ball bearing may be impaired. A limitation is therefore imposed on the range in which the method can be used. Since the preload is estimated from the value of the load at the time point where an abrupt displacement begins to take place, it is difficult to precisely determine the preload. It has however been conducted to determine the rigidity of a bearing by applying a load in a range not forming impression or damage on the surface of a raceway and then measuring a resulting displacement.

Next, in the case of the method disclosed in Japanese Patent Publication (Kokai) No. HEI 2-61700, the measuring instrument becomes complex, for example, a vibrator is needed because vibrations have to be applied to a ball bearing. Since measurement is conducted by applying vibrations while making a ball bearing unable to rotate (i.e., while maintaining the ball bearing in a stopped state), it is impossible to make evaluation at a practical revolution speed or a revolution speed close to the practical revolution speed.

Further, in the case of the method in which a preload is measured based on a starting torque, the preload cannot be determined accurately. The starting torque is prone to be affected by not only the preload but also other factors such as the quantity and viscosity of a lubricant such as grease, the state of contact of seals, etc. Since it is difficult to precisely ascertain influence of these other factors to the starting torque, the preload cannot be determined accurately from the starting torque.

SUMMARY OF THE INVENTION

An object of this invention is to provide a method for the measurement of a preload of a rolling bearing, which method is free of the inconvenience described above.

Another object of this invention is to provide an instrument for the measurement of a preload of a rolling bearing, which instrument is free of the inconvenience described above.

In a first aspect of this invention, there is thus provided a method for measuring a preload applied to a rolling bearing composed of an outer ring means having an outer raceway on an inner peripheral wall thereof, an inner ring means having an inner raceway on an outer peripheral wall thereof and plural rolling elements disposed for rotation between the outer raceway and the inner raceway. While rotating one of the outer ring means and inner ring means with the other ring means being maintained unable to rotate, vibrations of said one ring means or said the other ring means are measured, the resonance frequency of the rolling bearing is determined from the measurement data of the vibrations, the bearing rigidity of the rolling bearing is determined from the resonance frequency, and the preload is then determined from the bearing rigidity and the contact angle of the plural rolling elements.

According to a preferred embodiment of the first aspect of this invention, vibrations of said one ring means or said the other ring means caused by the rotation of said the other ring means are measured, the rotation frequency of the other ring means and the revolution frequency of the rolling elements are determined from the measurement data of the vibrations, and the preload of the rolling bearing is then determined from a contact angle determined from the rotation frequency and revolution frequency and the bearing rigidity.

In a second aspect of this invention, there is also provided an instrument for measuring a preload of a rolling bearing composed of an outer ring means having an outer raceway on an inner peripheral wall thereof, an inner ring means having an inner raceway on an outer peripheral wall thereof and plural rolling elements disposed for rotation between the outer raceway and the inner raceway, characterized in that said instrument comprises a pusher for pushing one of the outer ring means and inner ring means at a part thereof to make said one ring means unable to rotate, a drive means for rotating the other ring means, a vibration measuring element for measuring vibrations of said one ring means or said the other ring means, a frequency converter for determining the resonance frequency of the rolling bearing from an output signal from the vibration measuring element, and a first computing means for determining the preload of the rolling bearing from the resonance frequency determined by the frequency converter and also from the contact angle of the rolling elements.

According to a preferred embodiment of the second aspect of this invention, said instrument further comprises a second vibration measuring element for measuring vibrations of said one ring means or said the other ring means caused by the rotation of said the other ring means, an output signal from said second vibration measuring element being delivered to said frequency converter to determine the rotation frequency of said the other ring means and the revolution frequency of the rolling elements, and a second computing means for determining the contact angle of the rolling elements from the rotation frequency and revolution frequency determined by the frequency converter. A signal indicating the contact angle determined by said second computing means is inputted to said first computing means.

In the method and instrument according to the present invention for the measurement of a preload of a rolling bearing, the resonance frequency of the rolling bearing is determined from the measurement data of vibrations of one of outer and inner ring means so that the preload of the rolling bearing can be measured by a simple instrument at a practical revolution speed or a revolution speed close to the practical revolution speed.

Especially, in the case of the method and instrument according to the preferred embodiments of the first and second aspects of this invention, the rotation frequency of said the other ring means and the revolution frequency of rolling members are determined based on radial vibrations of said one ring means, and the contact angle of the rolling members is determined from the rotation frequency and the revolution frequency. It is therefore possible to accurately measure a preload of a rolling bearing in which the contact angle of rolling elements is not precisely known in advance.

The method and instrument according to the present invention for the measurement of a preload of a rolling bearing can determine the preload easily and accurately and, moreover, do not damage the rolling bearing upon conducting the measurement. This facilitates the automation of the measuring work so that the measuring instrument can be added to a manufacturing line for rolling bearings to inspect the preload of each rolling bearing manufactured through the line.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF PREFERRED EMBODIMENTS

Figure 1:
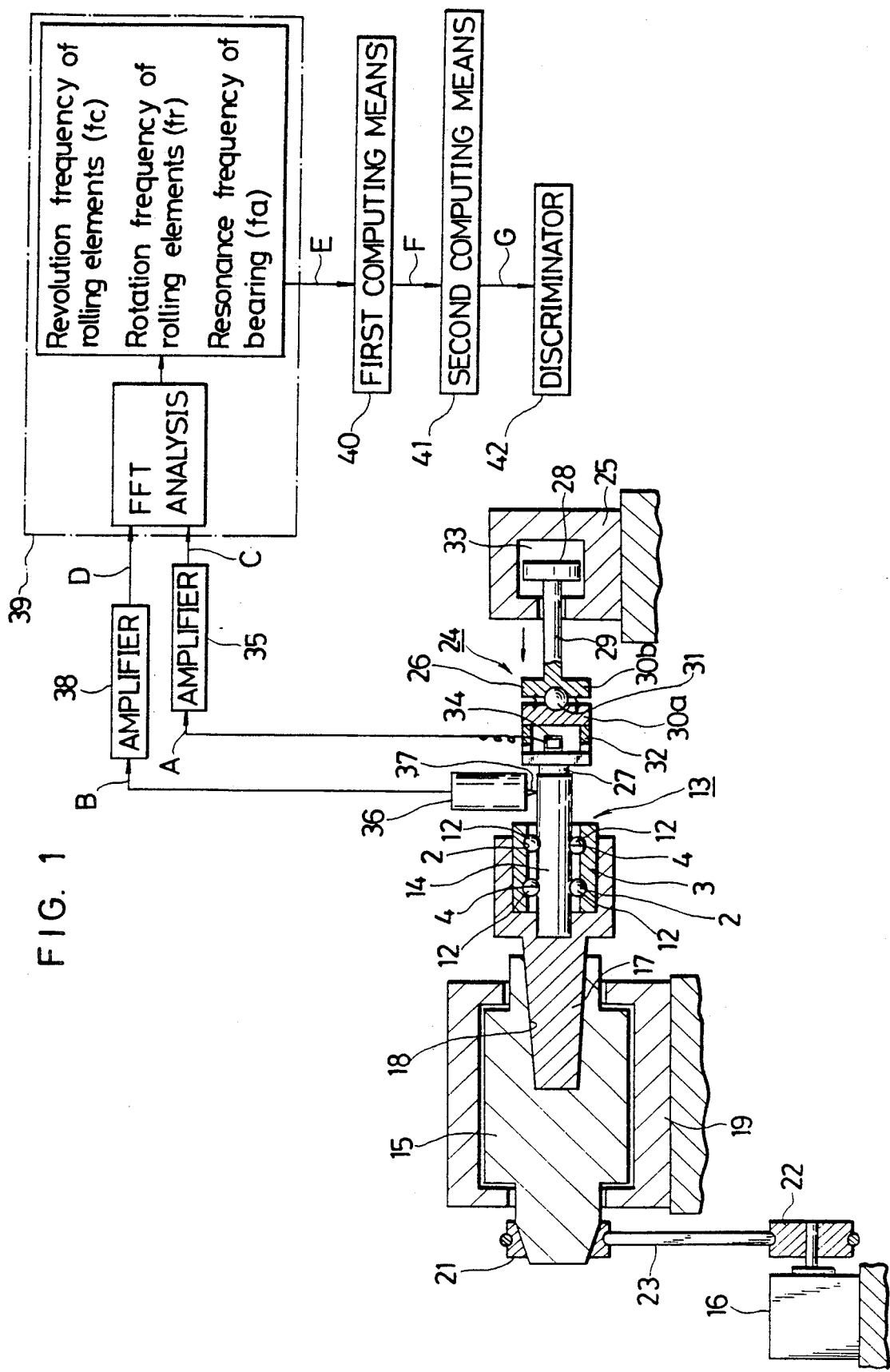
FIG. 1 is a simplified block diagram of a first embodiment of this invention.

FIG. 1 shows the first embodiment of the instrument according to this invention. A double-row ball bearing 13, whose preload is to be measured, is constructed of an outer ring 3 having double-row raceways 2,2 on an inner peripheral wall thereof, a shaft 14 having double-row inner raceways 4,4 on an outer peripheral wall thereof, and plural balls 12 rotatably disposed between the outer raceways 2,2 and the inner raceways 4,4. Upon measurement of its preload, the outer ring 3 of the double-row ball bearing 13 is externally fitted and supported on an arbor 17 which, in combination with a spindle 15, an electric motor 16 and the like to be described herein, constitutes a drive unit.

The arbor 17 is fixedly fitted in a tapered bore 18 formed centrally in one end portion (the right-hand end portion as viewed in FIG. 1) of the spindle 15. The spindle 15 is in turn supported for rotation inside a journal bearing 19. As the journal bearing 19, it is preferable to use a bearing of a structure not producing vibrations upon rotation of the spindle 15, such as a static pressure gas bearing, magnetic bearing or superconductive bearing.

The spindle 15 supported on the journal bearing 19 as described above can be driven and rotated by the electric motor 16. In the illustrated embodiment, a belt 23 passes around a driven pulley 21, which is fixed on an opposite end portion of the spindle 15, and also a drive pulley 22 fixed on an output shaft of the electric motor 16. Upon energization of the electric motor 16, the spindle 15 is driven at a constant speed, for example, at about 1,800 rpm.

By setting the tension of the belt 23 at a suitable level and also choosing an adequate material for the belt 23, the spindle 15 can be prevented from producing vibrations during rotation of the spindle 15 by the electric motor 16. Different from the illustrated embodiment, it is possible to concentrically arrange the spindle 15 and the output shaft of the electric motor 16 and to drive and rotate the spindle 15 by way of a magnet coupling or the like.

A pusher 24 is disposed opposite an end face of the shaft 14 of the double-row ball bearing 13 supported on the arbor 17. This pusher 24 has a pressure cylinder 25, a rocker coupling 26 and a push plate 27. A basal end portion of a rod 29 is fixed on a pressuring piston 28 which is fitted in the pressure cylinder 25. The rocker coupling 26 is connected to a free end portion of the rod 29. The rocker coupling 26 is composed of two plates 30a,30b and a ball 31 held between the plates 30a,30b, so that the plates 30a,30b are rockingly displaceable relative to each other.

The push plate 27 is supported on a side wall of the plate 30a, which is the plate facing the double-row ball bearing 13 (i.e., the left-hand plate as viewed in FIG. 1), with a damper 32 interposed therebetween. As working fluid is fed into a cylinder compartment 33 of the pressure cylinder 25, the push plate 27 is caused to move leftward as viewed in FIG. 1 and is pressed against the end face of the shaft 14 of the double-row ball bearing 13, so that the pusher plate 27 presses the shaft 14 in the axial direction (i.e., the leftward direction as viewed in FIG. 1). By this pressing operation, the shaft 14 is prevented from rotation even when the outer ring 3 is rotated as a result of energization of the electric motor 16.

The rocker coupling 26 serves to press the pusher plate 27 under equal force over the entire periphery thereof against the end face of the shaft 14 during the above pressing operation. The damper 32 prevents transmission of vibrations, which are produced at the pressure cylinder 25 or the rocker coupling 26, to the shaft 14. As the means for pressing the pusher plate 27 in the axial direction, another mechanism such as solenoid can be used in place of the pressure cylinder 25.

A vibration pickup 34 as a vibration measuring element is attached to one side of the pusher plate 27 at a location surrounded by the damper 32. The vibration pickup 34 measures axial (in the horizontal direction as viewed in FIG. 1) vibrations transmitted from the shaft 14 to the pusher plate 27, and sends a signal A indicative of measurement data to an amplifier unit 35. As the vibration measuring element, any other device or element can be used as long as it can detect such axial vibrations. Examples of other devices include a displacement gauge, a speedometer and an accelerometer.

A probe 37 of a second vibration pickup 36 as a second vibration measuring element is maintained in contact with an outer peripheral wall of the shaft 14. The second vibration pickup 36 measures radial vibrations of the shaft 14 and sends a signal B indicative of measurement data to a second amplifier unit 38. As the second vibration measuring element, any other device or element can also be used as long as it can detect such radial vibrations. Examples of other devices include a displacement gauge, a speedometer and an accelerometer.

Amplified signals C,D are sent from the first and second amplifier units 35,38, respectively, to a frequency converter 39. This frequency converter 39, which is constructed including a Fourier transformer, determines the resonance frequency $f_a$ of the double-row ball bearing 13, the rotation frequency $f_r$ of the outer ring 3 and the revolution frequency $f_c$ of the plural balls 12 by using fast Fourier transform (FFT).

Bearing rigidity $K_a$ which is related to a preload $F_a$ of the double-row ball bearing 13, said preload to be determined in accordance with this invention, can be expressed by a function of the above resonance frequency $f_a$ and contact angle $\alpha$ [$K_a = f(f_a,\alpha)$], the contact angle $\alpha$ can be represented by a function of the above rotation frequency $f_r$ and revolution frequency $f_c$ [$\alpha = f(f_r,f_c)$], and the preload $F_a$ can be expressed by a function of the above bearing rigidity $K_a$ and contact angle $\alpha$ [$F_a = f(K_a,\alpha)$]. It is therefore possible to determine the preload $F_a$ of the double-row ball bearing 13 once the resonance frequency $f_a$ of the double-row ball bearing 13, the rotation frequency $f_r$ of the outer ring 3 and the revolution frequency $f_c$ of the plural balls 12 are determined.

Namely, the contact angle $\alpha$ can be determined by the following formulae (1) and (2) from the rotation frequency $f_r$ and revolution frequency $f_c$, both determined by the frequency converter 39 as described above, the outer diameter $D_a$ of the balls 12 and the pitch diameter $d_m$ of the balls 12. Incidentally, the outer diameter $D_a$ and pitch diameter $d_m$ of the balls 12 are dimensions determined upon manufacture.

$$f_c = f_r(d_m + D_a \cos \alpha)/2d_m \qquad (1)$$

The formula (1) can be rewritten into the following formula (2):

$$\alpha = \cos^{-1} [d_m\{(2f_c/f_r) - 1\}/D_a] \qquad (2)$$

The rotation frequency $f_r$ of the outer ring 3 and the revolution frequency $f_c$ of the plural balls 12 can be determined from radial vibrations of the shaft 14 for the following reasons.

A description will first be made of the reasons for the successful determination of the rotation frequency $f_r$. Although individual members making up the double-row ball bearing 13 are finished with extreme accuracy, there is absolutely no case where no error exists in both their surface configurations and dimensions. For example, the outer raceways and the inner raceways are both eccentric relative to the center of rotation of the bearing although the degrees of their eccentricity are very small. Because of this eccentricity, a rotation frequency component is produced. The rotation frequency $f_r$ can therefore be determined by measuring any one of radial vibrations, angular vibrations and axial vibrations of the rotating ring as the other ring means or of the fixed ring as the one ring means.

A description will next be made of the reasons for the successful determination of the revolution frequency $f_c$. Although plural balls assembled in a single ball bearing are assumed to have the same outer diameter, the outer diameter slightly differs from one ball to another due to an unavoidable manufacturing error. Based on revolution of the plural balls whose outer diameters slightly differ from one another as mentioned above, the one ring means or the other ring means vibrates in a radial direction, angular direction or axial direction. The frequency of these vibrations coincides with the revolution frequency of the plural balls or with an integer multiple of the revolution frequency of the balls. Further, the outer raceways and inner raceways both undergo small meandering. During rotation of the other ring means, the one ring means or the other ring means vibrates in the radial direction, angular direction or axial direction due to the meandering. The frequency of these vibrations therefore contains the revolution frequency component of the balls. The revolution frequency of the balls can, therefore, be determined once the frequency of radial, angular or axial vibrations of the one ring means or the other ring means is obtained.

As has been described above, the frequency converter 39 determines, on the basis of vibrations of the shaft 14, the rotation frequency $f_r$ of the outer ring 3 and the revolution frequency $f_c$ of the balls 12 as well as the resonance frequency $f_a$ of the double-row ball bearing 13. Signals E indicating the respective frequencies $f_r$, $f_c$ and $f_a$ are sent to a first computing means 40. The first computing means 40 determines the contact angle $\alpha$ by using the above formulae (1) and (2) and then determines the bearing rigidity $K_a$ of the double-row ball bearing 13 in accordance with the above-described function $K_a = f(f_a, \alpha)$.

Signals F indicating the contact angle $\alpha$ and bearing rigidity $K_a$ determined by the first computing means 40 are next delivered to a second computing means 41. The second computing means 41 then determines the preload $F_a$ of the double-row ball bearing 13 on the basis of the signals F. Incidentally, the method for determining the bearing rigidity $K_a$ from the contact angle $\alpha$ and resonance frequency $f_a$ and further determining the preload $F_a$ can be readily known to a person of ordinary skill in the art by applying known theorem to the formulae described, for example, in "NSK Report", 59–66, November 1989 published by the Assignee company or "Korogari Jukuuke Kogaku (Rolling Bearing Engineering)", 248–252, compiled by the Rolling Bearing Engineering Edition Committee and published by Kabushiki Kaisha Yokendo. Detailed description of the method is therefore omitted herein.

Figure 2:
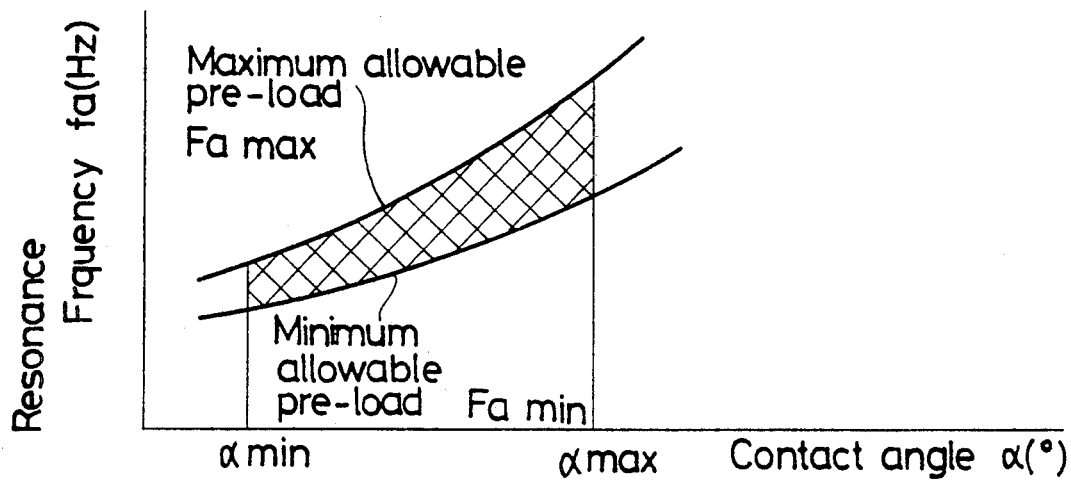
FIG. 2 is a diagram showing appropriate ranges of preload and contact angle.

In the illustrated embodiment, a signal G indicating the preload $F_a$ determined by the second computing means 41 is outputted to a discriminator 42. By the discriminator 42, it is therefore judged whether the preload $F_a$ applied to the double-row ball bearing 13 falls within the appropriate range or not. Namely, a maximum permissible value $F_{amax}$ and a minimum permissible value $F_{amin}$ of the preload $F_a$ as well as a maximum permissible value $\alpha_{max}$ and a minimum permissible value $\alpha_{min}$ of the contact angle $\alpha$, said values being all shown in FIG. 2, are stored in the discriminator 42. When the preload $F_a$ of the double-row ball bearing 13 is between the maximum permissible value $F_{amax}$ and the minimum permissible value $F_{amin}$ and the contact angle $\alpha$ is between the maximum permissible value $\alpha_{max}$ and the minimum permissible value $\alpha_{min}$, in other words, when the preload $F_a$ and contact angle $\alpha$ are located within the cross-hatched range in FIG. 2, the discriminator 42 judges that the double-row ball bearing 13 is non-defective but, when the preload $F_a$ and contact angle $\alpha$ are located outside the cross-hatched range in FIG. 2, the discriminator 42 judges that the double-row ball bearing 13 is defective.

According to the instrument according to this invention which instrument is constructed and is operated as described above and is adapted to measure a preload of a rolling bearing, the frequencies of vibrations in the thrust and radial directions of the shaft 14 are measured while rotating the outer ring 3 of the double-row ball bearing 13, and the preload $F_a$ is then determined from these vibrational frequencies. The preload $F_a$ can therefore be determined easily and accurately and, moreover, the double-row ball bearing 13 is not damaged by the measuring work.

In the illustrated embodiment, the bearing rigidity $K_a$ is determined from vibrations of the shaft 14 in the thrust direction. However, the bearing rigidity $K_a$ can also be obtained from vibrations of the shaft 14 in the radial direction or from vibrations of the shaft 14 in the angular direction.

Figure 3:
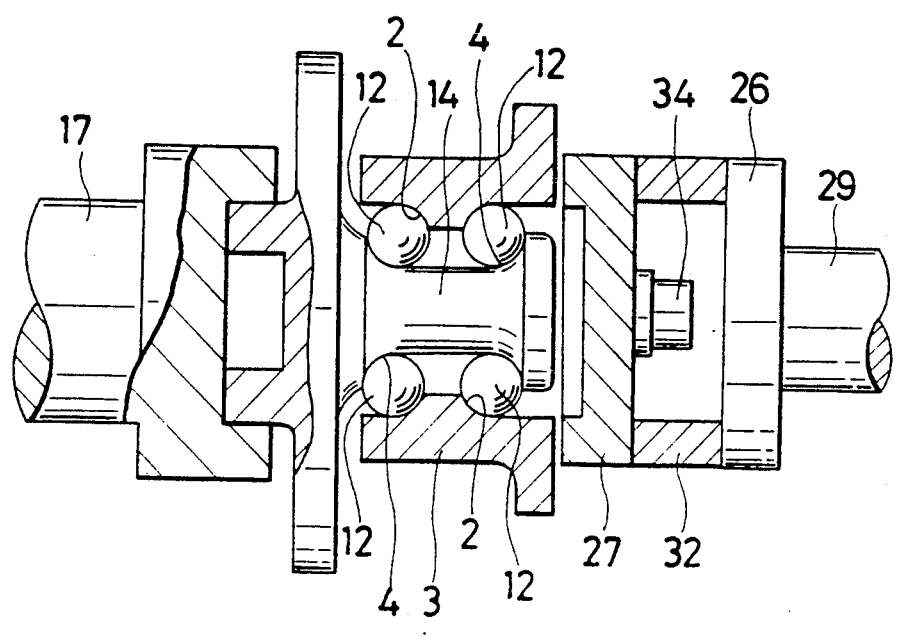
FIG. 3 is a fragmentary schematic cross-section of a second embodiment of this invention.

In the first embodiment illustrated in FIG. 1, vibrations of the shaft 14 are measured while the shaft 14 is fixed and the outer ring 3 is rotated. Conversely, as is illustrated in FIG. 3, the preload $F_a$ of the double-row ball bearing 13 can also be determined by measuring vibrations of the outer ring 3 while fixing the outer ring 3 and rotating the shaft 14.

Figure 4:
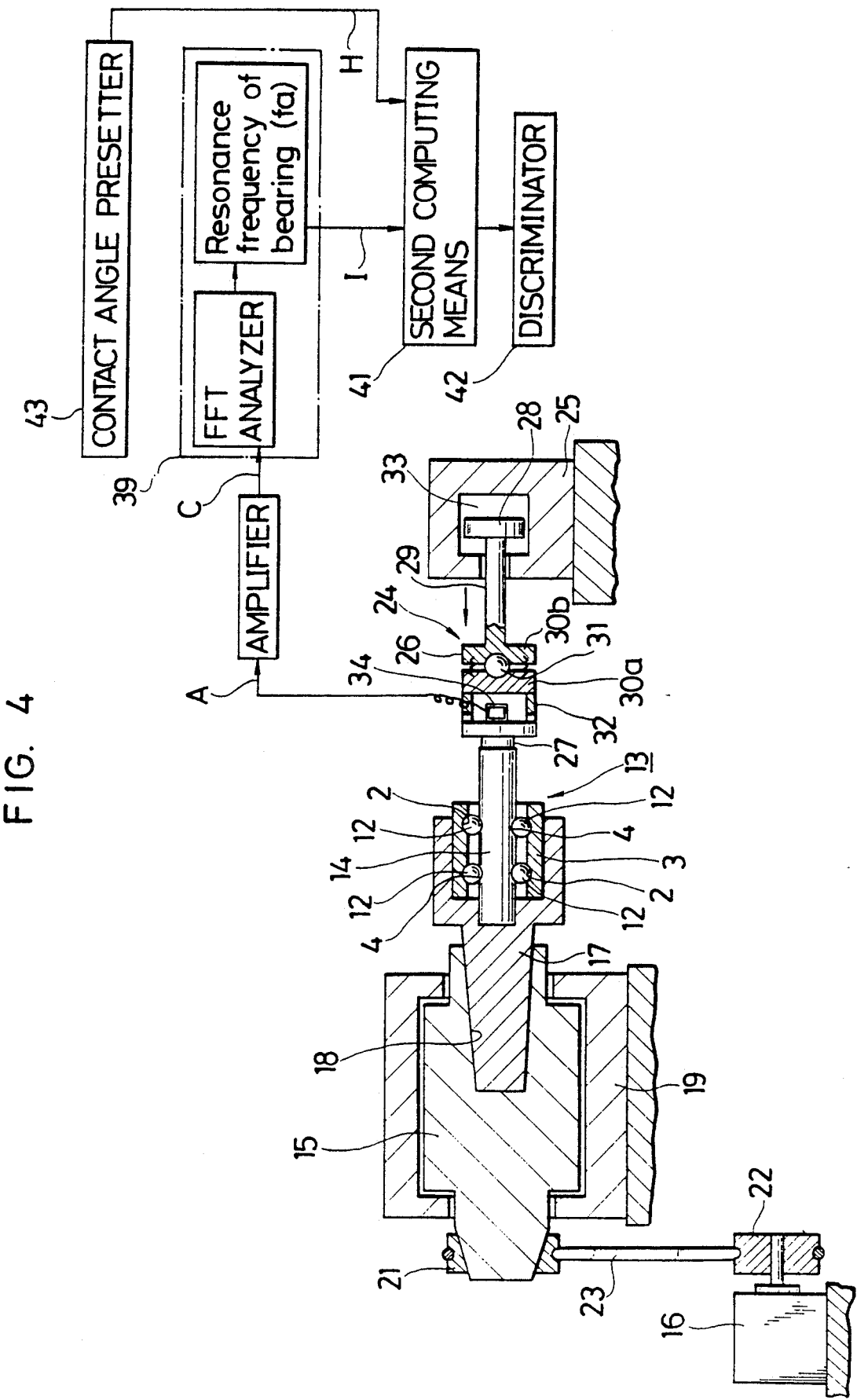
FIG. 4 is a simplified block diagram of a third embodiment of this invention.
Figure 5:
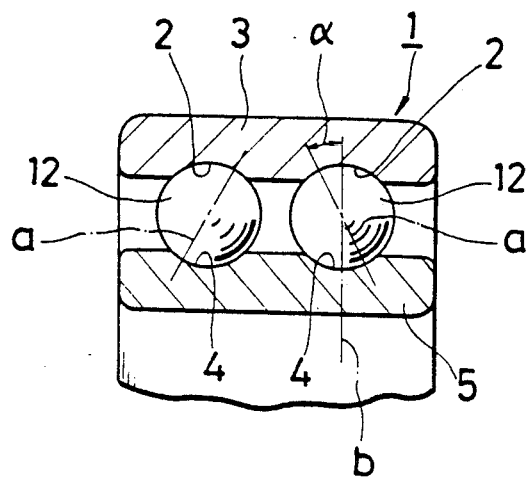
FIG. 5 is a fragmentary cross-section of one example of ball bearings.
Figure 6:
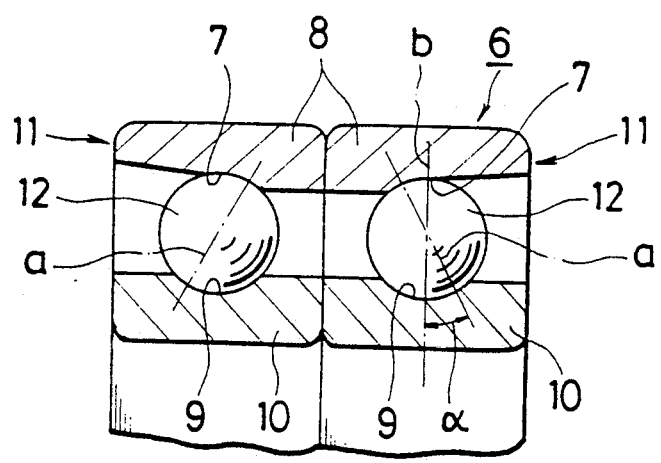
FIG. 6 is a fragmentary cross-section of another example of ball bearings.

When the rotation frequency of the shaft 14 and the revolution frequency of the balls 12 are determined based on radial vibrations of the outer ring 3, the following formulae (3) and (4) should be used instead of the formulae (1) and (2).

$$f_c = f_r(d_m - D_a \cos \alpha)/2d_m \quad (3)$$

$$\alpha = \cos^{-1}[d_m\{1 - (2f_c/f_r)\}/D_a] \quad (4)$$

Where the contact angle $\alpha$ of the balls 12 constituting the double-row ball bearing 13 whose preload $F_a$ is to be measured is known in advance, a signal H indicating the contact angle $\alpha$ is sent from a contact angle presetter 43 to a second computing means 41 and, based on the signal I indicating the bearing rigidity $K_a$ determined based on the value measured by the vibration pickup 34 and the above signal H, the preload $F_a$ can be determined (see FIG. 4).

The present invention has been described above, centering around the measurement of a preload of a double-row ball bearing. It is to be noted that the method and instrument of this invention for the measurement of a preload of a rolling bearing can also be applied upon measurement of preloads of duplex ball bearings, double-row roller bearings and duplex roller bearings.

What is claimed is:

1. In a method for measuring a preload applied to a rolling bearing which has a resonance frequency and comprises an outer rotatable means having an outer raceway on an inner peripheral wall thereof, an inner rotatable means having an inner raceway on an outer peripheral wall thereof and plural rolling elements disposed for rotation between the outer raceway and the inner raceway, the improvement comprising measuring vibrations of one or the other of said rotatable means while rotating said one rotatable means and maintaining the other of said rotatable means unable to rotate, thereby providing data, determining the resonance frequency of the rolling bearing, rotation frequency of said one rotatable means, and revolution frequency of said plural rolling elements from the measurement data of the vibrations, determining the bearing rigidity of the rolling bearing from the resonance frequency, determining the contact angle from the rotation frequency and revolution frequency and determining the preload from the bearing rigidity and the contact angle of the plural rolling elements.

2. The method of claim 1, wherein said outer rotatable means is a ring.

3. The method of claim 1, wherein said inner rotatable means is a ring.

4. The method of claim 1, wherein said inner rotatable means is a shaft.

5. In an instrument for measuring a preload of a rolling bearing which has a resonance frequency and comprises an outer rotatable means having an outer raceway on an inner peripheral wall thereof, an inner rotatable means having an inner raceway on an outer peripheral wall thereof and plural rolling elements disposed for rotation between the outer raceway and the inner raceway, the improvement wherein said instrument comprises a pusher for pushing one of said rotatable means at a part thereof to make said one rotatable means unable to rotate; a drive means for rotating the other of said rotatable means; a vibration measuring element for measuring vibrations of said one rotatable means or said other rotatable means and providing an output signal; a frequency converter for determining the resonance frequency of the rolling bearing, the rotation frequency of said outer rotatable means and the revolution frequency of said plural rolling elements, from said output signal from the vibration measuring elements; a first computing means for determining the contact angle of the rolling elements; and a second computing means for determining the preload of the rolling bearing from the resonance frequency determined by the frequency converter and also from the contact angle of the rolling elements.

6. The instrument of claim 5, wherein said instrument further comprises a second vibration measuring element for measuring vibrations of said one rotatable means or said other rotatable means caused by the rotation of said other rotatable means and providing a second output signal, said second output signal being delivered to said frequency converter to determine the rotation frequency of said other rotatable means and the revolution frequency of the rolling elements, said first computing means determining the contact angle of the rolling elements from the rotation frequency and revolution frequency determined by the frequency converter and providing a third output signal indicating the contact angle determined by said first computing means, said third output signal being inputted to said second computing means.

* * * * *